Feb. 9, 1937. F. W. COTTERMAN 2,069,818
AUTOMOTIVE CLUTCH CONTROL MECHANISM
Filed March 17, 1933 9 Sheets-Sheet 1

INVENTOR.
Frederick W Cotterman

Feb. 9, 1937.  F. W. COTTERMAN  2,069,818
AUTOMOTIVE CLUTCH CONTROL MECHANISM
Filed March 17, 1933   9 Sheets-Sheet 7

INVENTOR
Frederick W. Cotterman

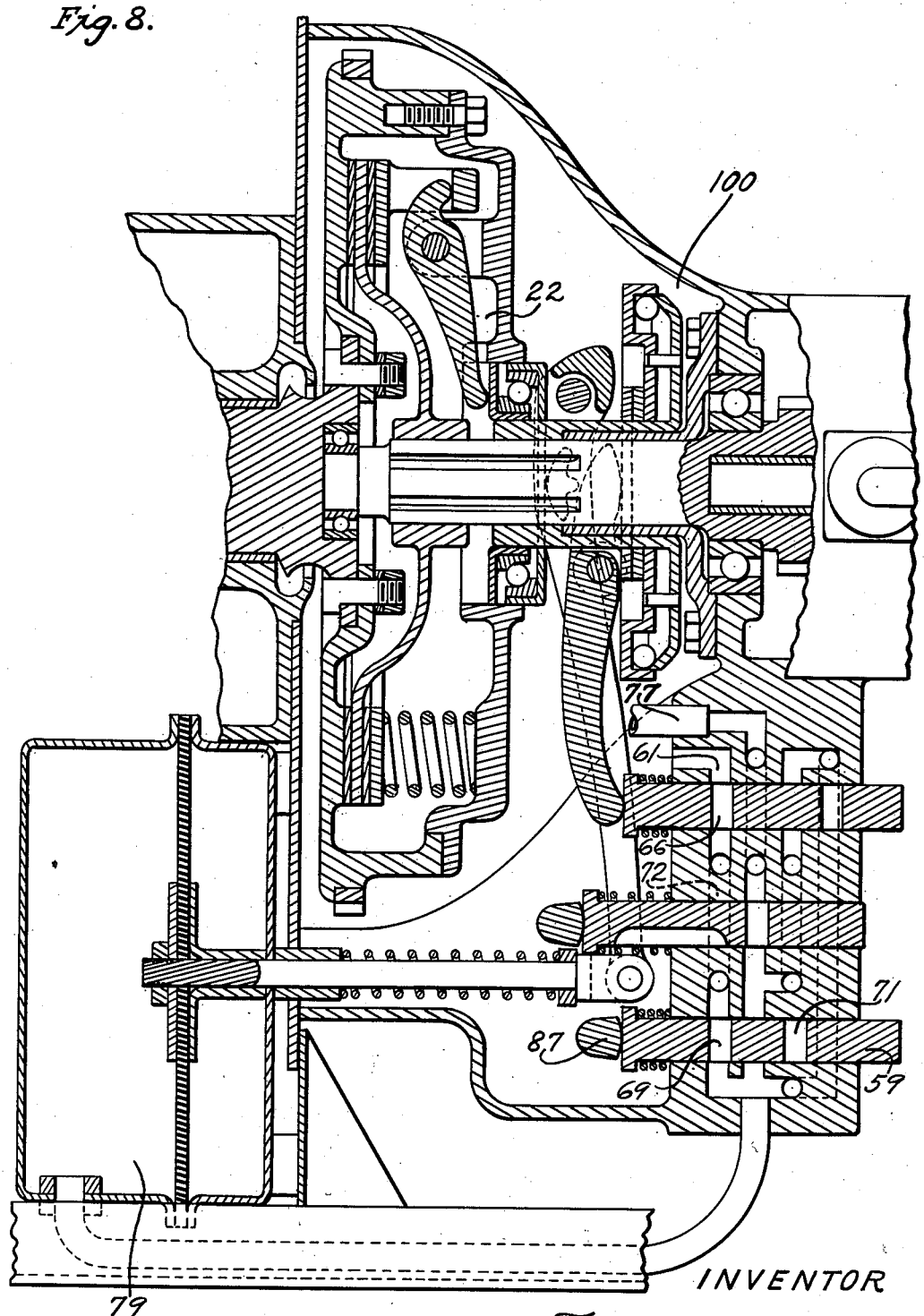

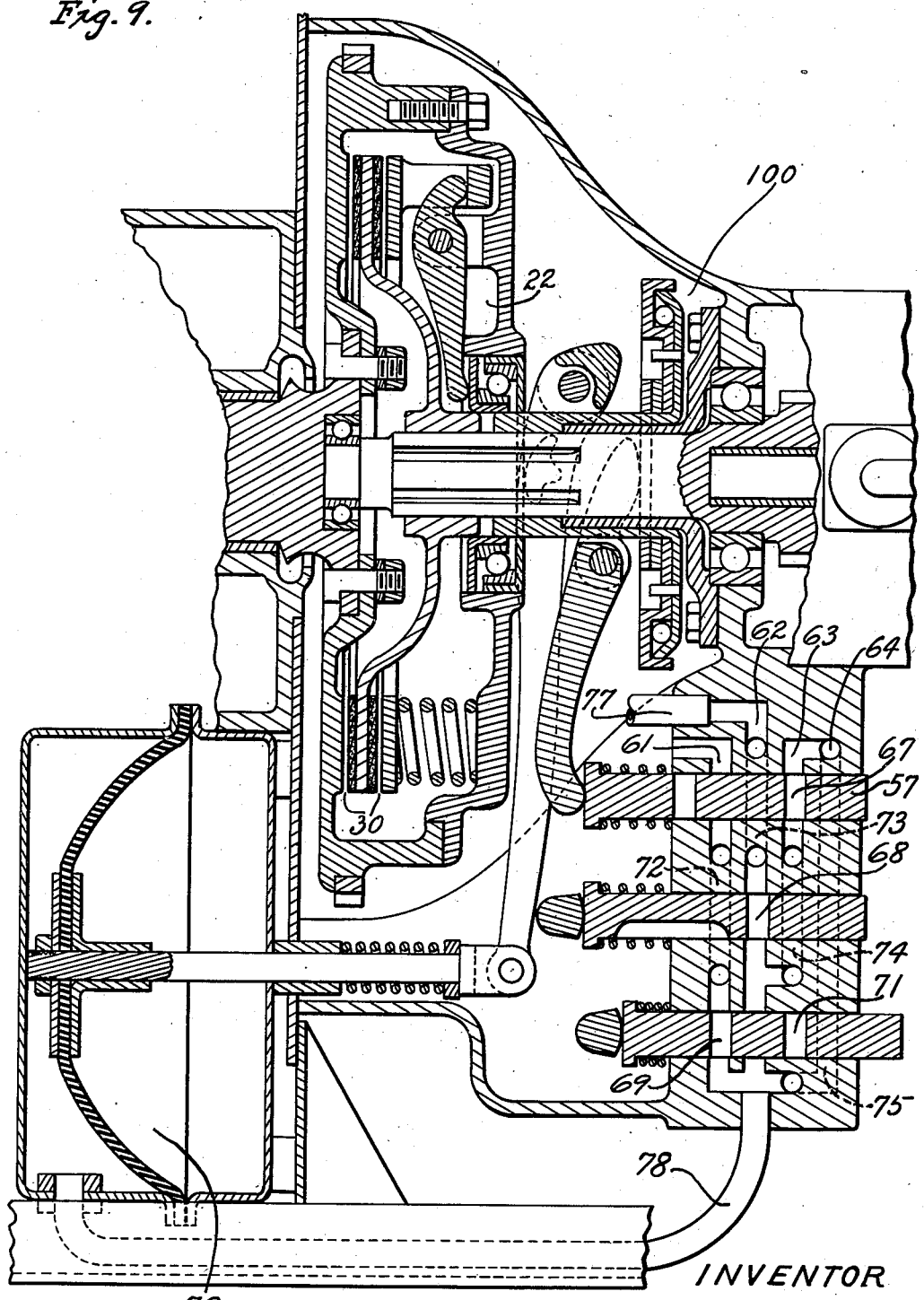

Patented Feb. 9, 1937

2,069,818

UNITED STATES PATENT OFFICE 2,069,818

AUTOMOTIVE CLUTCH CONTROL MECHANISM

Frederick W. Cotterman, Dayton, Ohio, assignor of one-half to estate of Vincent G. Apple, deceased, Dayton, Ohio, by Herbert F. Apple, Edward M. Apple, and Gourley Darroch, executors Application March 17, 1933, Serial No. 661,325

26 Claims. (Cl. 192—.01)

This invention relates to automotive clutch control mechanism, having particular reference to mechanism employing power means for engaging and disengaging the engine clutch.

An object of the invention is to provide power means with control mechanism operative to cause engagement of the clutch whenever the accelerator pedal of the vehicle is depressed and disengagement of the clutch when the accelerator pedal is released.

Another object is to provide control mechanism for the power means operative to cause engagement of the clutch when the brake pedal of the vehicle is depressed and disengagement of the clutch when the brake pedal is released.

Still another object is to provide automatic control mechanism for the power means operative to neutralize the effect which depression of the brake pedal has to engage the clutch, whenever the brake pedal is kept in a depressed condition until the movement of the vehicle reaches a certain low speed.

Still another object is to provide a structure which will carry into effect the several objects enumerated with the addition of very little mechanism over that used in common practice.

A considerable advantage is secured by the placing and arrangement of the several parts of the invention in such a manner that no enlargement and little alteration of the mechanism of common practice is required to admit embodiment of the improved features herein described.

That these and other objects and meritorious features enumerated are attained will become more apparent to those skilled in the art as the invention is described in detail and reference is had to the drawings, wherein—

Figs. 4 to 9 are views similar to Fig. 3 but with the movable parts of the mechanism in each view operated to different positions relative to each other.

Similar numerals refer to similar parts throughout the several views.

Figure 1:
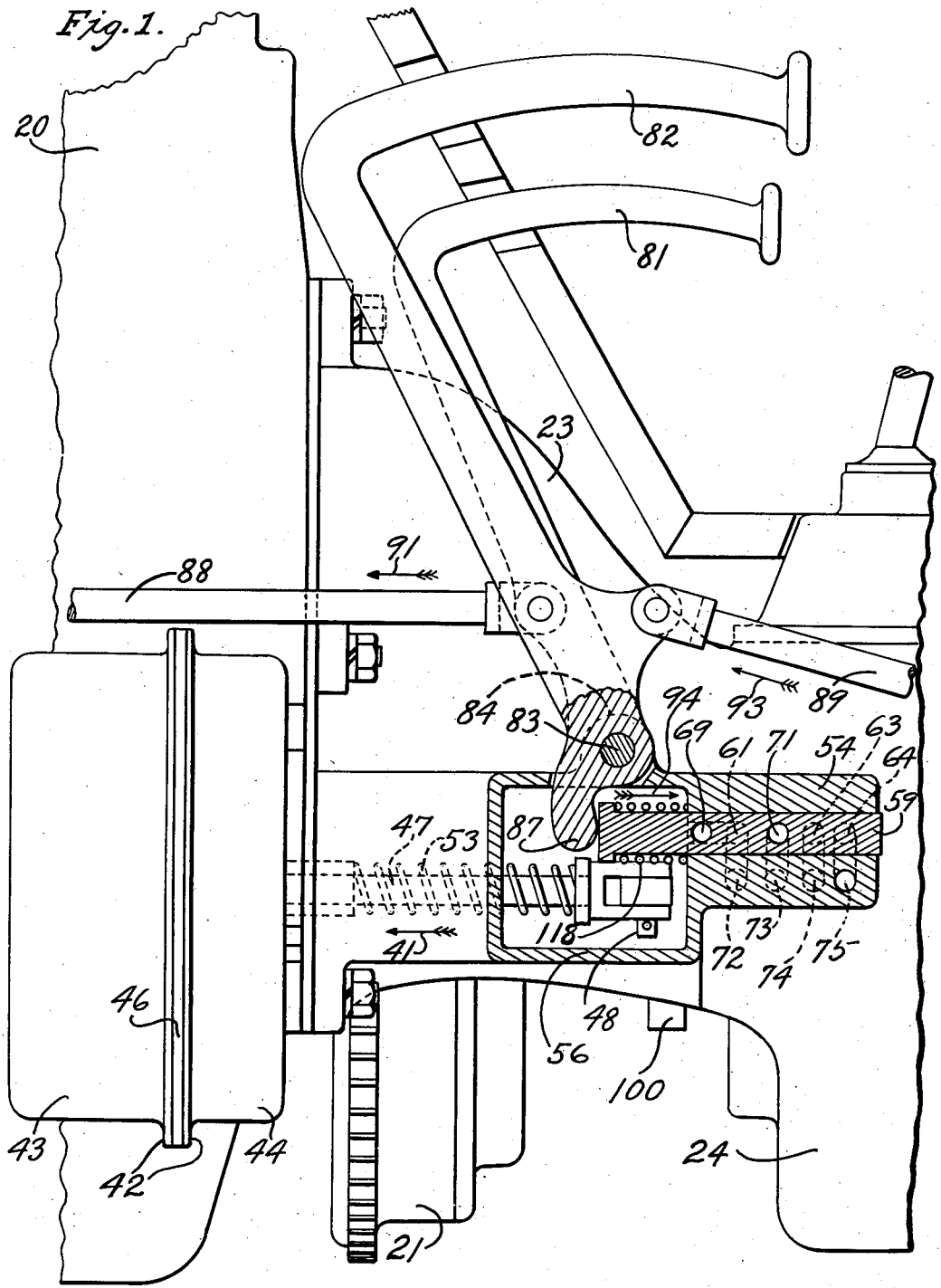
Fig. 1 is a side elevation of an embodiment of the invention with a small portion shown in longitudinal vertical section as on the line 1—1 of Fig. 3.

In the drawings, 20 is an automotive engine having a flywheel 21 containing a clutch 22. A flywheel cover 23 supports the housing 24 which contains the transmission gears. The clutch pinion 26 only of the transmission gears is shown.

Parts 20 to 26 are constructed and arranged and operable substantially as in standard practice. The clutch 22 comprises the driven clutch plate 27 slidable axially in splines 28 of the clutch pinion 26. Clutch plate 27 carries the friction facings 29.

The pressure plate 31 rotated by the flywheel 21 is axially withdrawable from the clutch plate by the dogs 32 when their inner ends 33 are acted against by the ball thrust bearing 34. Springs 35 urge the pressure plate 31 toward the clutch plate 27.

The clutch operating lever 36 has a hinge pin 37 in a hub 40 depending from flywheel cover 23 and has fingers 38 resting against the thrust bearing 34 whereby movement of the outer end 39 in the direction of the arrow 41 will withdraw the pressure plate 31, create the spaces 30 adjacent the facings 29 and disengage the clutch.

The flanges 42 of the hollow drums 43 and 44 hold the flexible diaphragm 46 clamped pressure tight between them. The rod 47 is hinged to the end of the lever 36 by the pin 48. A flanged sleeve 49 is fastened to the rod 47 and the diaphragm 46 is held between the flanged sleeve and the washer 51 by the nut 52. A spring 53 urges the rod 47 in a direction opposite to the arrow 41.

Extending laterally from the transmission housing 24 and the flywheel cover 23 is the valve block 54 which is extended to form a valve housing 56. Extending crosswise through the valve block 54 are three valve plungers 57, 58, and 59 slidably fitted to openings in the block.

Extending lengthwise of the block 54 are four air passages 61, 62, 63, and 64. These passages for the most part are on the same plane as the plungers and in some instances are carried through the plungers by the ports 66, 67, 68, 69, and 71. But, in places where it is not desirable for the passages to continue through the plungers, no ports are provided, and in these places the passages descend to a lower plane and pass under the plungers as at 72, 73, 74, and 75. Plunger 58 has a slot 76 in its side for purposes which will later appear.

A pipe 77 enters the valve block 54 and communicates with the inner end of the passage 62. A second pipe 78 extends from the other end of the valve block and connects the passage 62 to the chamber 79 within the drum 43. The other end of the pipe 77 which is broken away and not shown in the drawings may be connected to any suitable source of vacuum supply. In the embodiment herein disclosed it will be considered connected to the intake manifold of the engine 20.

The accelerator pedal 81 and the brake pedal 82 are both hinged by the same pin 83 through ears 84 carried on the valve housing 56. The accelerator pedal 81 has a downwardly depending finger 86 bearing on the end of the plunger 58. The brake pedal 82 has a like downwardly depending finger 87 bearing on the end of the plunger 59. The accelerator pedal 81 when depressed operates a forwardly extending rod 88 which is adapted for connection to the carbureter whereby the fuel fed to the engine is increased in the usual manner as the accelerator pedal is depressed. The brake pedal 82 operates a rearwardly extending rod 89 which is adapted for connection to a brake shaft as in common practice.

It will be seen that simultaneously with the depression of the accelerator pedal 81 to move the rod 88 in the direction of the arrow 91 to increase the fuel, the finger 86 will move the plunger 58 in the direction of the arrow 92, and, simultaneously with the depression of the brake pedal 82, to move the rod 89 in the direction of the arrow 93 to apply the brakes to the vehicle wheels, the finger 87 will move the plunger 59 in the direction of the arrow 94.

The ball bearing cover plate 96 has a long hub 97 surrounding the stem of the clutch pinion 26. Rotatable about the long hub 97 is the hub 98 of a centrifugal governor which may be broadly designated by the numeral 100. The one end of the hub 98 engages the splines 28 and at the other end has an outwardly extending flange 99 bent over as at 101. The governor hub 98 always rotates in unison with the clutch plate 27.

Surrounding the governor hub 98 is a governor disc 102 channeled at 103 to carry a circular row of balls 104.

The disc 102 is driven in unison with the flange 99 by the pins 106. The pins are fitted tightly in holes in the flange 99 and freely in holes in the disc 102 whereby the disc has limited axial movement relative to the flange. Two end thrust washers 107 and 108 of relatively low coefficient of friction surround the hub 98 adjacent the disc 102.

The valve operating lever 109 has a hinge pin 111 in a hub 112 depending from the flywheel cover 23. Fingers 113 rest against the washer 107. The outer end 114 of the lever 109 rests against the plunger 57. Axial movement of the disc 102 in the direction of the arrow 116 will move the plunger 57 in the direction of the arrow 117. Springs 118 return the plungers 57, 58, and 59 to their normal unoperated positions shown in Fig. 3.

Figure 2:
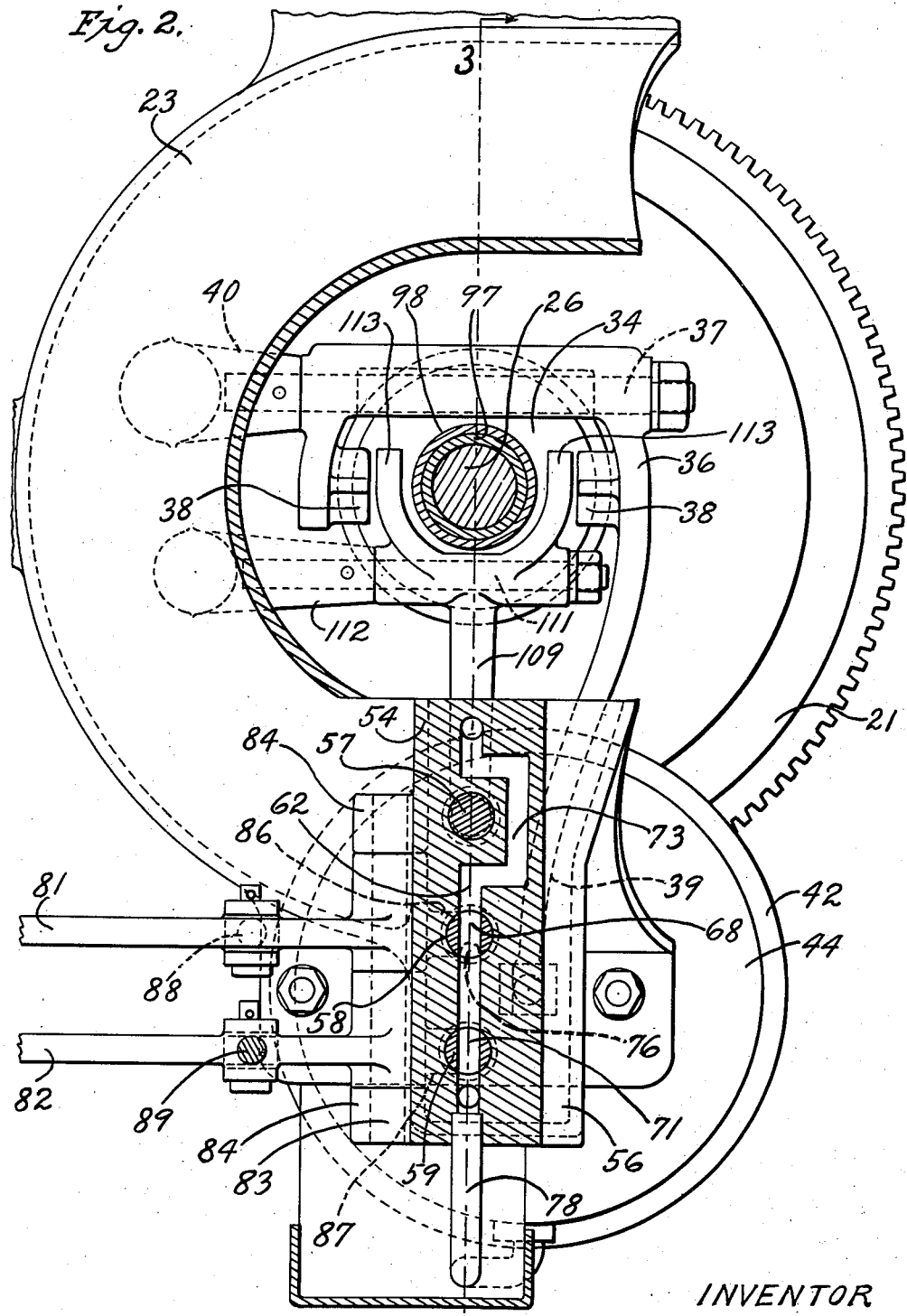
Fig. 2 is a transverse section taken at 2—2 of Fig. 3.
Figure 3:
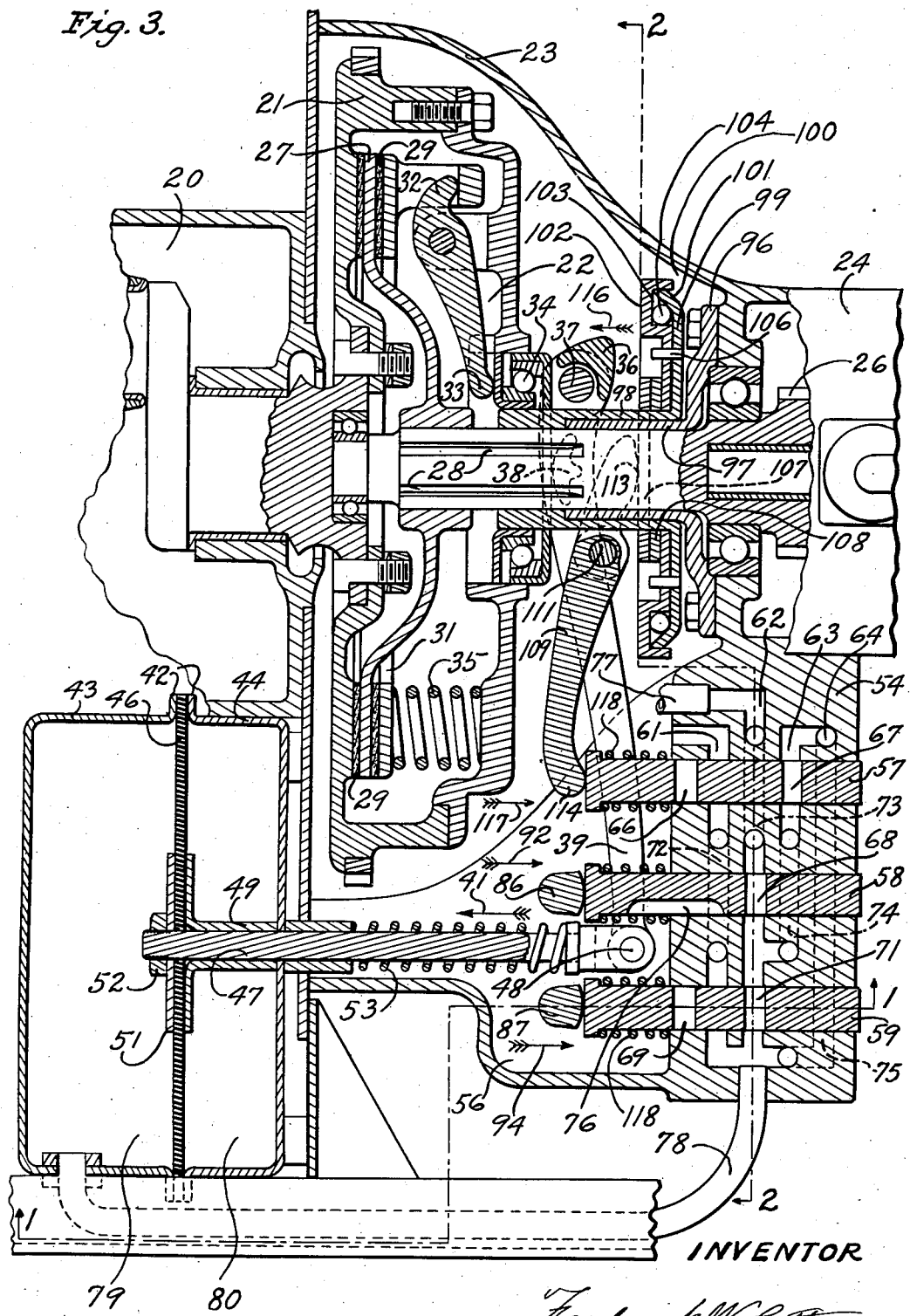
Fig. 3 is a horizontal axial section taken at 3—3 of Fig. 2.

The operation of the mechanism described is as follows:

When the vehicle and the engine are both at rest the several movable parts of the mechanism are arranged in the relation to each other which is shown in Figs. 1, 2, and 3, that is, neither of the pedals 81 or 82 are depressed and the clutch 22 is engaged, because, with the engine at rest, there is no vacuum to disengage the clutch.

When the engine is started and vacuum is created in the intake manifold, the air in the chamber 79 will be drawn to the intake manifold through a main vacuum duct comprising the pipe 78, the ports 71 and 68, the passage 73—62 and the pipe 77. An auxiliary vacuum duct comprises the pipe 78, the passage 75—64—63, the port 67, the passage 74, the port 68, the passage 73—62, and the pipe 77. This auxiliary vacuum duct is not at this time needed but its purpose will later appear.

Figure 4:
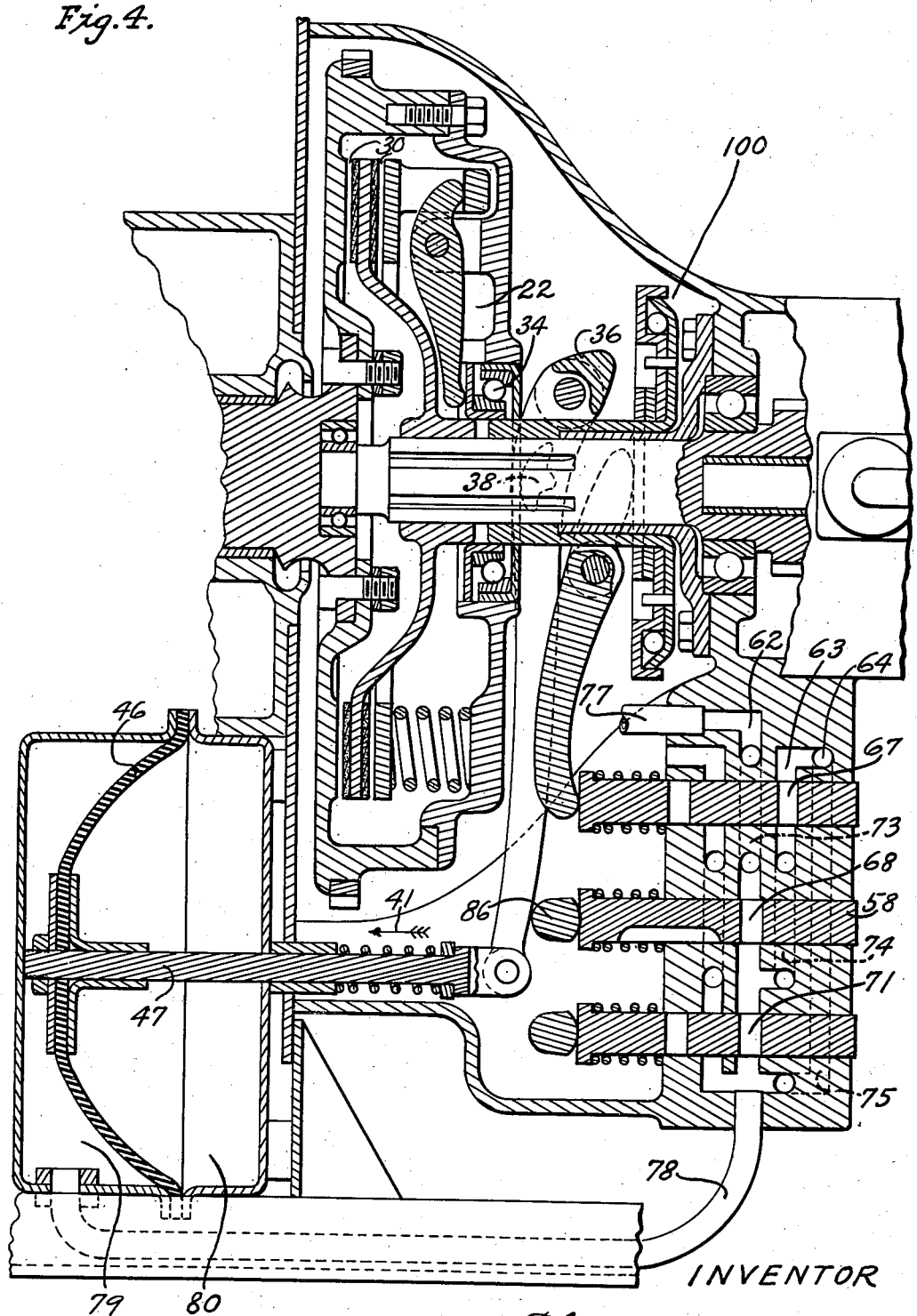

When the air in the chamber 79 is thus exhausted the atmospheric pressure in the opposite chamber 80 causes the diaphragm 46 to assume the position shown in Fig. 4, where the rod 47 has been moved by the diaphragm 46 in the direction of the arrow 41 whereby the lever 36 has been actuated to press the fingers 38 against the ball thrust bearing 34 and thereby open the space 30 which disengages the engine clutch 22.

It will be seen that nothing was done to change from clutch engagement Fig. 3 to clutch disengagement Fig. 4 except to start the engine, that is, neither accelerator nor brake pedal was depressed, nor did the governor 100 act in any manner. When however, the speed of the engine is increased by depressing the accelerator pedal 81 the finger 86 also shifts a valve plunger 58 as in Fig. 5, whereupon the slot 76 provides a bleeder duct to admit free air into the chamber 79 which permits the springs 53 and 35 to expand and reengage the clutch 22. The plunger 58 also shifts the port 68 so as to cut off the suction through the pipe 77 and the passage 62, which closes not only the main vacuum duct through the port 71 and pipe 78 but also the auxiliary vacuum duct comprising the passage 74, the port 67, the passage 63—64—75 and the pipe 78.

Now as long as the vehicle is being driven at a low speed, that is, at any speed at which the engine is revolving not more than one hundred R. P. M. in excess of its idling speed, there will be no change in the arrangement of parts from that shown in Fig. 5.

Figure 6:
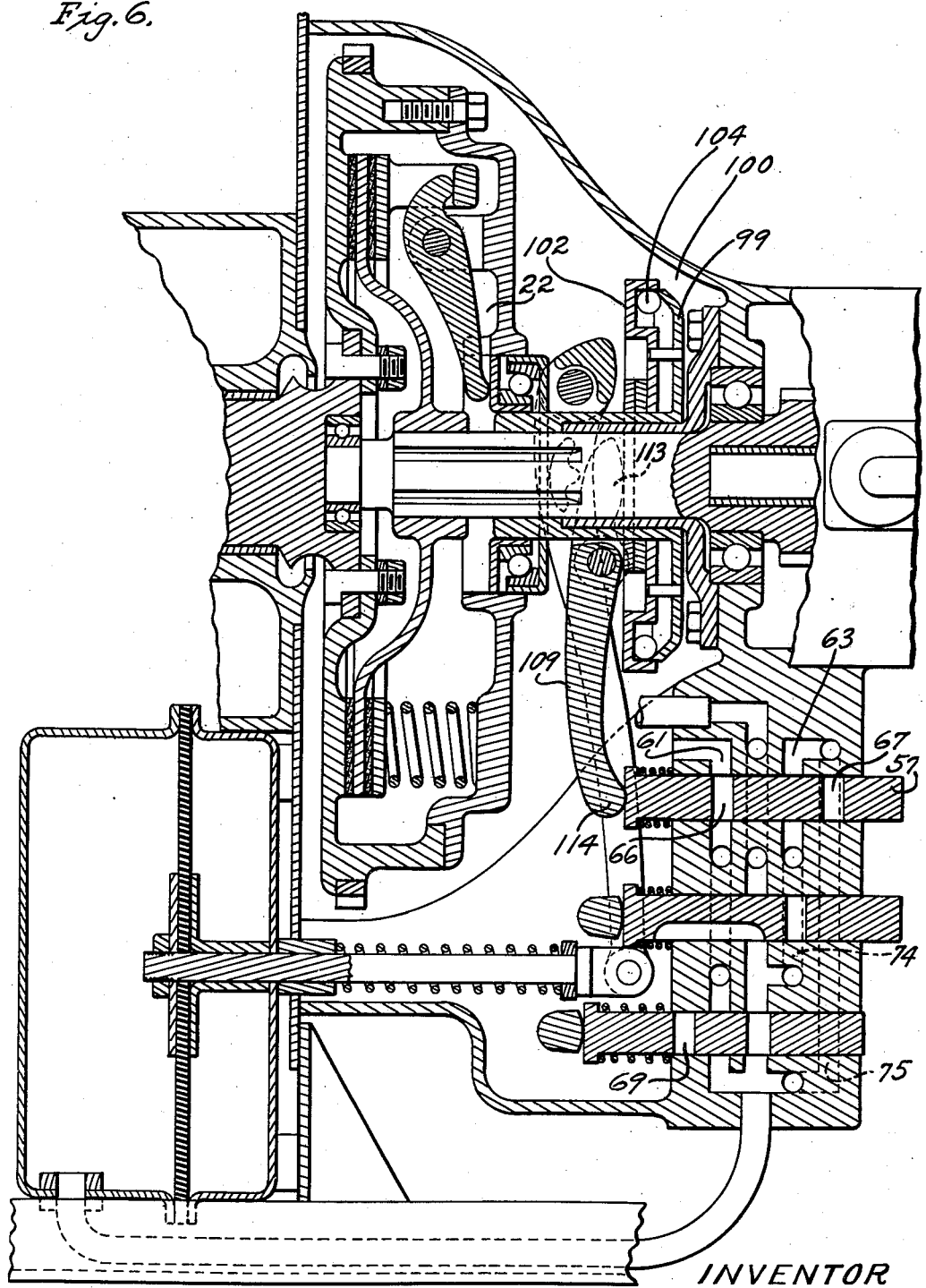

But when the driving speed is increased until the engine revolves at more than one hundred R. P. M. in excess of its idling speed, the change in the governor 100 takes place as shown in Fig. 6 where the balls 104 have moved outward from their axis of rotation and shifted the disc 102 axially away from the flange 99, which moved the fingers 113 of the lever 109 and locked the lever, which caused the end 114 to shift the plunger 57 as shown. For convenience of description the governor 100 when shifted as shown in Fig. 6 may be referred to as being in its operated condition.

Figure 5:
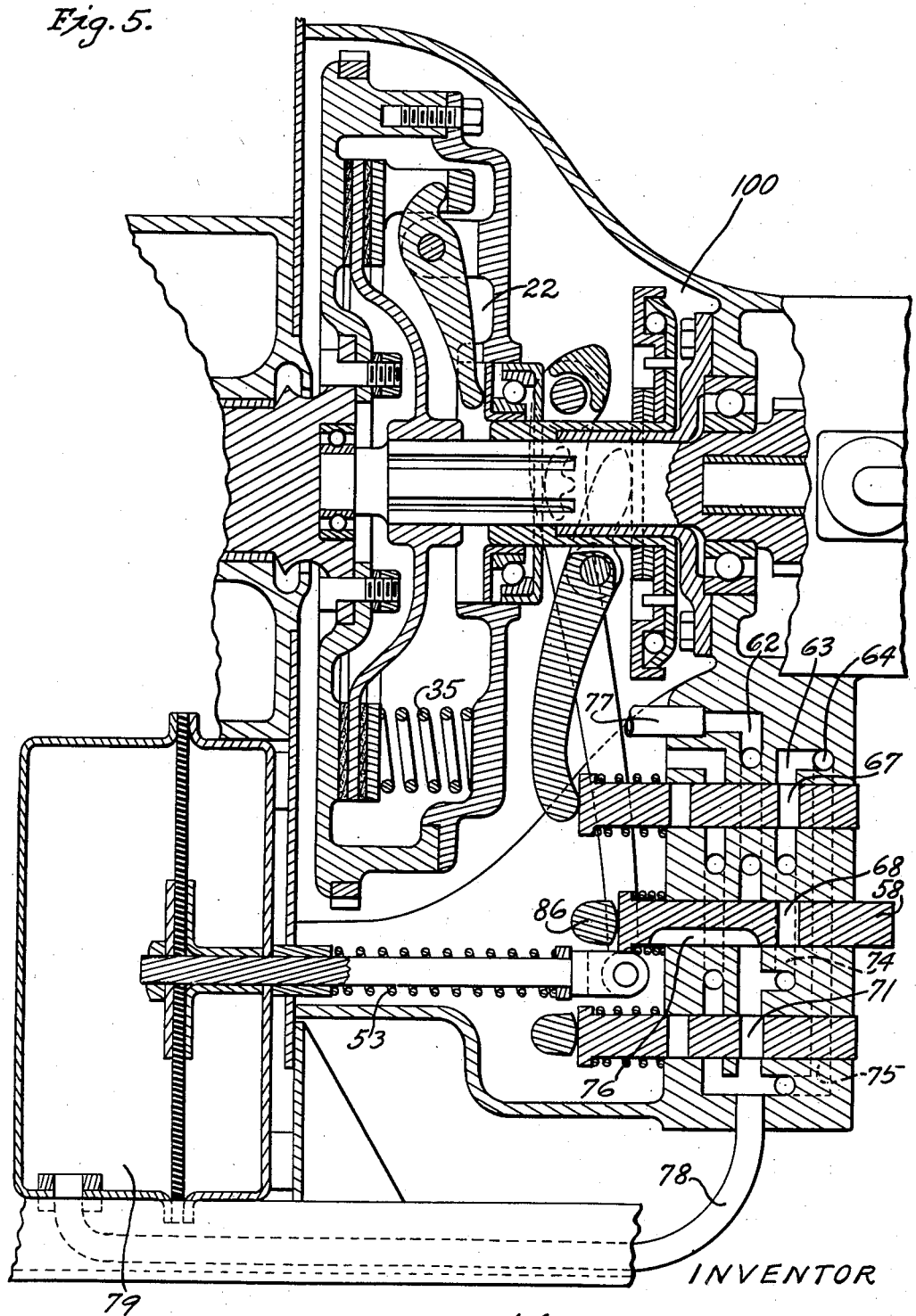

By reference to Fig. 6 it will be seen that the clutch 22 still remains engaged, just as it was in Fig. 5, and that therefore no immediate effect was had from the shifting of the plunger 57. It will be seen however, that the shifting of the plunger 57 has shifted the port 67 and thereby closed the auxiliary vacuum duct comprising the passage 74—63—75 which heretofore was open. It has also shifted the port 66 in alignment with the bleeder duct 61, but this bleeder duct is not yet effective, as such, because to be effective the port 66 and the port 69 must both be open at the same time.

Figure 7:
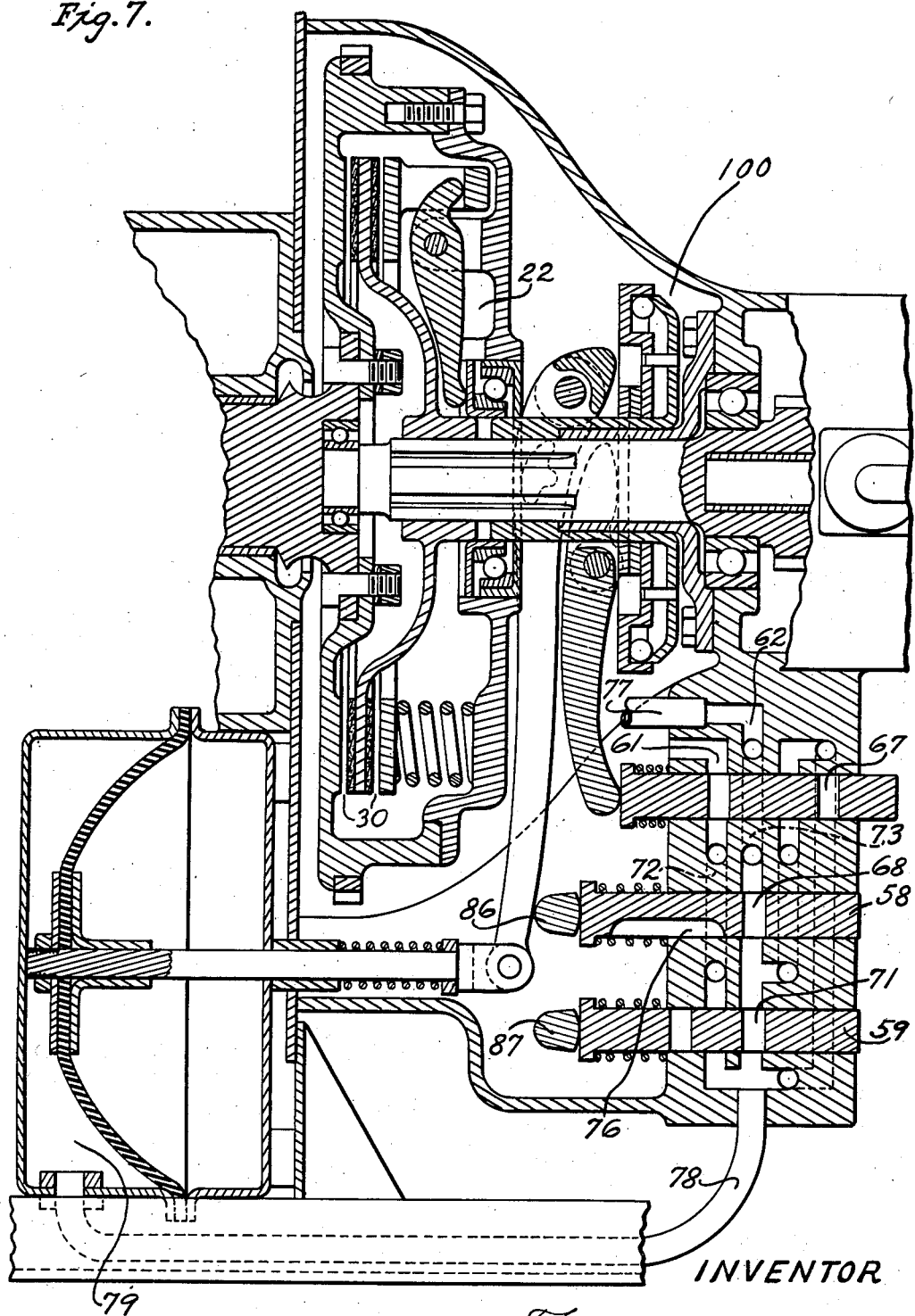

If now the vehicle is driven at a sufficient speed to maintain the governor 100 in its operated condition and the accelerator is completely released as in Fig. 7, so that the finger 86 releases the plunger 58 then the clutch 22 will be instantly disengaged as shown, because both the bleeder ducts 76 and 61—72 are closed and the main vacuum duct 78—71—68—73—62—77 is still open, although the auxiliary vacuum duct is now closed by the shifting of the port 67. The complete release of the accelerator pedal to release the finger 86 from the plunger 58 as shown in Fig. 7 causes the vehicle to free wheel because the air is again drawn from the chamber 79 and the clutch is disengaged as shown.

With the accelerator pedal and the clutch both released as shown the engine drops to idling speed and rests. It should here be observed that the governor 100 remains in the operated condition regardless of the fact that the engine has fallen to a low speed which would return the governor to normal. This is because the governor is now being driven by the vehicle and not by the engine. The importance of having the governor driven by the vehicle will later appear.

Assuming now that the arrangement of the mechanism is as in Fig. 7 and the vehicle is free wheeling at a reasonably high speed, and it is desired to bring it to a stop. In such case the brake pedal 82 is depressed and the regular wheel brakes are applied through the rod 89. But when the brake pedal 82 is depressed the finger 87 shifts the plunger 59 and the mechanism assumes the condition shown in Fig. 8. Here the finger 87 has shifted the plunger 59 until the port 69 has opened the bleeder duct 72—66—61 and the port 71 has shut all communication with the vacuum pipe 77, whereupon the air has been bled into the chamber 79 and the clutch 22 has been reengaged. By this arrangement so called engine braking is established when wheel braking is applied.

But, as is well known, wheel braking must be maintained until and after the vehicle comes to rest, while engine braking must be discontinued before the vehicle runs so slow as to stall the engine. To meet this requirement is the main function of the governor 100.

Fig. 9 shows the relative arrangement of the parts when, by the application of both wheel braking and engine braking, the vehicle has been reduced to a speed at which the clutch must release the engine or stall it.

Here the vehicle speed is so low that the governor 100 has returned to normal and thereby permitted the spring 118 to shift the plunger 57 to normal and closed the bleeder passage 78—69—72—61 and opened the auxiliary vacuum duct 77—62—73—68—74—67—63—64—75—78 whereby the clutch 22 is disengaged because the air from the chamber 79 is exhausted, although at this time the main vacuum duct is being held closed because the brake pedal is still applied and the port 71 is still closed. The foregoing discloses the reason for having both a main and an auxiliary vacuum duct.

It will now also be apparent why the governor 100 must be driven by the vehicle and not by the engine. For, if it were driven by the engine, then, when the accelerator pedal was released, and the clutch thereby disengaged so that the vehicle free wheeled, the engine would at once drop to idling speed and return the governor 100 to normal, regardless of the high speed of the vehicle due to momentum. If the governor was thus returned to normal at a high vehicle speed, then the application of the wheel brakes would not add engine braking, for, it is only when the governor 100 is in the operated condition that application of the wheel brakes brings in engine braking to assist in bringing the vehicle to a stop.

Briefly summarized, when the engine is stopped the mechanism is as shown in Fig. 3. Starting the engine disengages the clutch as in Fig. 4 whereupon the engine idles at about three hundred R. P. M. Depressing the accelerator pedal reengages the clutch as in Fig. 5. The vehicle now moves slowly. Slightly speeding up the vehicle now operates the centrifugal governor as in Fig. 6. At any speed full release of the accelerator pedal releases the clutch for free wheeling as in Fig. 7.

While free wheeling at speeds of over four M. P. H. in high gear, the application of the wheel brakes reengages the clutch, thereby adding engine braking to wheel braking as in Fig. 8. When by means of both wheel braking and engine braking the vehicle speed has been reduced to about four M. P. H. in high gear, then engine braking is withdrawn and wheel braking completes the act of bringing the vehicle to rest and holding it in a position of rest as in Fig. 9. The R. P. M. suggested at which the engine should idle, and the M. P. H. at which the governor should become operative are merely arbitrary. It is possible by suitably proportioning the several parts to vary these speeds within reasonable limits.

The advantages of the improved control mechanism herein disclosed are obvious. Ever since free wheeling has become a popular feature on automobiles the question of its safety has been constantly before the public. Vehicles which are provided with free wheeling are also provided with a manually operable means whereby the free wheeling feature may be eliminated. There is no doubt but that free wheeling is highly desirable whenever the vehicle is coasting on momentum except when the wheel brakes are being applied. Then instantly free wheeling becomes highly undesirable. Inasmuch as the wheel brakes are so frequently applied in driving a motor vehicle it is quite inconvenient to have to operate the manual means which eliminates the free wheeling feature every time the brakes are applied. With the improved control mechanism herein shown the free wheeling feature of a motor vehicle is automatically had when it is most desirable and automatically eliminated when it is most undesirable.

Having described an embodiment of my invention wherein the objects hereinbefore set forth are attained, I claim—

1. Automotive vehicle control mechanism comprising, an engine, vehicle propelling means, a clutch for rotatably connecting said engine and vehicle propelling means, a centrifugal governor rotatable by movement of said propelling means independently of engine rotation, a brake pedal for applying vehicle brakes, suction means for operating said clutch having a suction duct and a bleeder duct, and two valves, one operated by said brake pedal and the other by a connection to said governor, said valves comprising means to open said suction duct and close said bleeder duct when said brake pedal is depressed while the vehicle moves slower than a determined speed and comprising means to close said suction duct and reopen said bleeder duct if the vehicle again moves faster than a determined speed while the brake pedal is still depressed.

2. Automotive vehicle control mechanism comprising, an engine, vehicle propelling means, a clutch for rotatably connecting said engine and vehicle propelling means, a centrifugal governor rotatable by movement of said propelling means, a brake pedal for applying vehicle brakes, fluid operated mechanism for operating said clutch having a main fluid duct and an auxiliary fluid duct, a valve operable by depressing said brake pedal, a second valve operable by movement of said governor at a determined vehicle speed while said clutch is disengaged, the first said valve being operative to close the main fluid duct when said brakes are applied and the second valve being operative to close the auxiliary fluid duct when the vehicle moves faster than the said determined speed.

3. Automotive vehicle control mechanism comprising, an engine, a clutch for connecting said engine and vehicle, a centrifugal governor rotatable by movement of said vehicle, a brake pedal for applying vehicle brakes, vacuum operated mechanism for operating said clutch having a main vacuum duct, an auxiliary vacuum duct, and a bleeder duct, a valve operable by depressing said brake pedal, a second valve operable by movement of said governor at a determined vehicle speed, the first said valve comprising means to close the main vacuum duct and open the bleeder duct when the brakes are applied, and the second said valve comprising means to open the auxiliary vacuum duct and close the bleeder duct when the vehicle moves less than the said determined speed.

4. Automotive vehicle control mechanism comprising, an engine, a clutch for connecting said engine and vehicle, a brake pedal for applying vehicle brakes, an accelerator pedal for increasing the speed of said engine, a centrifugal governor rotatable by movement of said vehicle, air actuated mechanism for operating said clutch having a main duct, an auxiliary pressure duct and a bleeder duct, a valve operable by depressing said brake pedal, a second valve operable by depressing said accelerator pedal, a third valve operable by said governor when said vehicle moves at a determined speed, the first said valve comprising means to open the main duct and close the bleeder duct when the brakes are released, the second valve comprising means to open the main duct when the accelerator pedal is released, and the third said valve comprising means to close the auxiliary duct and open the bleeder duct when the vehicle moves faster than the said determined speed.

5. Automotive vehicle control mechanism comprising, an engine, a clutch for connecting said engine and vehicle, a brake pedal for applying vehicle brakes, an accelerator pedal for increasing the speed of said engine, a centrifugal governor rotatable by movement of said vehicle, air actuated mechanism for operating said clutch having a main duct, an auxiliary pressure duct and a bleeder duct, a valve operable by depression of said brake pedal, a second valve operable by depression of said accelerator pedal, a third valve operable by said governor when said vehicle moves at a determined speed, the first said valve comprising means to close the main duct and open the bleeder duct when the brakes are applied, the second valve comprising means to close both the main and auxiliary ducts when the accelerator pedal is depressed, and the third valve comprising means to close the auxiliary duct and open the bleeder duct when the vehicle exceeds the said determined speed.

6. The combination, in an automotive vehicle, of an engine rotatable without moving said vehicle, a vehicle propelling means, a clutch for rotatably connecting said engine to said vehicle propelling means, a speed responsive means operated by movement of said vehicle propelling means irrespective of the rotation of said engine, vehicle brakes, means operative by application of said brakes at any speed above a predetermined speed for engaging said clutch, and means operable by said speed responsive means when said vehicle moves first less then more than said predetermined speed to respectively disengage then reengage said clutch while said brakes are still applied.

7. In an automotive vehicle, the combination of an engine, a driving member rotatable by said engine irrespective of the movement of the vehicle, a driven member rotatable by movement of said vehicle irrespective of the rotation of the engine, a centrifugal means secured directly to the driven member to rotate in unison therewith, means to engage the driving and driven members for rotation in unison, means to disengage the driving and driven members for separate rotation, vehicle brakes, means operative by application of said brakes at any speed above a predetermined speed for causing said engaging means to act, and means operative by rotation of said centrifugal means first below then above said predetermined speed for causing said disengaging means to respectively overcome then release said engaging means.

8. Control mechanism for an automotive vehicle comprising, an engine, vehicle propelling means, means engageable to rotatably connect said engine and vehicle propelling means, means for operating said connecting means into and out of engagement, vehicle brakes, means operative by application of said brakes at any speed above a predetermined speed to engage said connecting means, and automatic means operative by the rate of movement of said vehicle propelling means irrespective of the speed of rotation of said engine to permit said brake application to operate said connecting means into engagement when the vehicle is moving above said predetermined speed while the engine is at a lower speed and to prevent said brake application from operating said connecting means into engagement when the vehicle is moving below the said predetermined speed.

9. Control mechanism for an automotive vehicle comprising, an engine, vehicle propelling means, connecting means for rotatably connecting or disconnecting said engine and vehicle propelling means whereby they may operate together or independently of each other, vehicle brakes, means operative upon application of said brakes at any speed above a predetermined speed to operate said connecting means to thereby reconnect said engine and vehicle propelling means after they have been disconnected, and means driven by the said independent movement of said vehicle propelling means alternately above or below a fixed vehicle speed to respectively connect or disconnect said engine operative only while said brakes are applied.

10. Control mechanism for an automotive vehicle comprising, an engine, vehicle propelling means, clutch means for rotatably connecting or disconnecting said engine and vehicle propelling means whereby they may operate together or independently, an accelerator depressible to increase the engine speed, vehicle brakes, means operative upon depression or release of said accelerator to operate said clutch means to respectively connect or disconnect said engine and vehicle propelling means, means operative upon application or release of said vehicle brakes to operate said clutch means to respectively connect or disconnect said engine and vehicle propelling means, and means driven by said independent movement of said vehicle propelling means alternately above or below a fixed vehicle speed to operate said clutch means to respectively connect or disconnect said engine operative only while said accelerator pedal is released and said brakes are applied.

11. Control mechanism for an automotive vehicle comprising, an engine, vehicle propelling means, clutch means for operatively connecting or disconnecting said vehicle propelling means and engine whereby said vehicle may be moved by said engine or may move independently, clutch engaging means, an accelerator releasable to decrease the engine speed, vehicle brakes applicable to decrease the vehicle speed, and means for operating said clutch engaging means operative when the vehicle is moving on a down grade upon a concurrence of a released accelerator and consequent low engine speed, lightly applied brakes and a consequently increasing vehicle speed and a passing of the speed of the independently moving vehicle above a predetermined value, to operatively reconnect the engine to the vehicle propelling means and thereby bring the rotative speed of the rotative engine up to the speed of the vehicle propelling means.

12. Control mechanism for an automotive vehicle comprising, vehicle propelling means, an engine rotatably connectible to said vehicle propelling means, vacuum operated means to disconnect said engine from said vehicle propelling means whereby said vehicle propelling means may operate independently of said engine, reconnecting means operative when said vacuum is cut off, centrifugal means operative by movement of said vehicle propelling means while moving independently of said engine to cut off said vacuum to thereby permit said reconnecting means to reconnect said engine and vehicle propelling means, brake applying means, means operative by application of said brake applying means to cut off said vacuum to thereby permit said reconnecting means to reconnect said engine and vehicle propelling means, said centrifugal means becoming operative to cut off said vacuum to permit said reconnecting means to reconnect said engine and vehicle propelling means and thereby bring the speed of the engine up to the speed of the vehicle propelling means whenever said vehicle speed rises above a predetermined value while said brake applying means is still applied and said engine is disconnected from, and rotating at a lower speed than said vehicle propelling means.

13. Control mechanism for an automotive vehicle comprising, vehicle propelling means, an engine normally rotatably connected to said vehicle propelling means, power means to disconnect said engine from said vehicle propelling means, whereby said vehicle propelling means may operate independently of said engine, speed responsive means operative by movement of said vehicle propelling means while moving independently to cut off said power means to permit connection of said engine and vehicle propelling means, brake applying means, means operative by application of said brake applying means to cut off said power means to permit connection of said engine and vehicle propelling means, said speed responsive means becoming operative to cut off said power means to permit connection of said engine and vehicle propelling means and thereby bring the speed of the engine up to the speed of the vehicle propelling means whenever said vehicle speed rises above a predetermined value while said brake applying means is still applied and the engine is rotating at a lower speed than the vehicle propelling means and is rotatably disconnected therefrom.

14. Control mechanism for an automotive vehicle comprising, an engine, vehicle propelling means, a clutch normally closed connecting the engine and vehicle propelling means, power means to open the clutch whereby the vehicle propelling means may operate independently of the engine, centrifugally operated power cut-off means operative at a predetermined rise in vehicle speed while said vehicle propelling means is moving independently, a brake pedal, brake pedal operated power cut-off means operative when said brake pedal is depressed, said centrifugally operated power cut-off means and said brake pedal operated power cut-off means being operative to cut off said power and close said clutch whenever the speed of the vehicle propelling means rises above said predetermined value while said brake pedal is applied and the engine is disconnected from the vehicle propelling means and is rotating at a lower speed than said vehicle propelling means.

15. Control mechanism for an automotive vehicle comprising, an engine, a rotatable vehicle propelling member, a clutch for rotatably connecting said engine to said vehicle propelling member, said member being rotatable by movement of said vehicle when said clutch is disengaged, power means applicable to keep said clutch disengaged, clutch engaging means operable when said power means is cut off, a speed responsive means rotatable by said propelling member both when said clutch is engaged and disengaged, an engine accelerating means releasable to reduce the engine to a low idling speed, a brake applying means, and power control means operative by said speed responsive means, said accelerating means and said brake applying means conjointly comprising means to apply said power operative by the releasing of said accelerating means, to cut off said power operative by application of the brake applying means when the accelerating means is still released, to apply said power by the rotation of the said propelling member, below a predetermined speed when the brake applying means is still applied and the accelerating means is still released, and to cut off said power by the rotation of said propelling member above the said predetermined speed when the brake applying means is still applied and the accelerating pedal is still released.

16. Control mechanism for an automotive vehicle comprising, an engine, a rotatable vehicle propelling member, a clutch for rotatably connecting said engine to said vehicle propelling member, said member being rotatable by movement of said vehicle when said clutch is disengaged, power means applicable to keep said clutch disengaged, clutch engaging means operable when said power means is cut off, speed responsive means rotated by said propelling member both when said clutch is engaged and disengaged, a brake applying means, and power control means comprising means to cut off said power to effect clutch engagement operative by the combined operation of the speed responsive means above a predetermined speed and operation of the brake applying means, or to apply said power to effect clutch disengagement operative by rotation of the propelling member below the said predetermined speed while said brake applying means is still operated, or to cut off said power and effect clutch reengagement operative by the rotation of the propelling member above the said predetermined speed while said brake applying means is still operated.

17. Control mechanism for an automotive vehicle comprising, an engine, a rotatable vehicle propelling member, a clutch for rotatably connecting said engine to said vehicle propelling member, said member being rotatable by movement of said vehicle when said clutch is disengaged, fluid actuated means operative to keep said clutch disengaged, resilient means operative to reengage said clutch when said fluid actuated means is inoperative, centrifugal means rotated by said propelling member both when said clutch is engaged and disengaged, a brake applying means, and fluid valve mechanism to cut off said fluid to effect clutch engagement operative by the combined rotating of the propelling member above a predetermined minimum speed and operating the brake applying means, or to apply said fluid to effect clutch disengagement operative by the rotating of the propelling member below said predetermined minimum while said brake applying means is still operated, or to cut off said fluid to effect clutch reengagement by the rotating of the propelling member above said predetermined minimum while said brake applying means is still operated.

18. Control mechanism for an automotive vehicle comprising, an engine, a rotatable vehicle propelling member, a clutch for rotatably connecting said engine to said vehicle propelling member, said member being rotatable by movement of said vehicle when said clutch is disengaged, vacuum actuated means operative to keep said clutch disengaged, spring means operative to reengage said clutch when said vacuum actuated means is inoperative, a centrifugal governor secured to said propelling member to rotate therewith both when said clutch is engaged and disengaged, a brake pedal, and air valve mechanism to disconnect or connect said vacuum to effect clutch engagement or disengagement respectively, operative by the combined rotation of the centrifugal governor above a predetermined minimum speed and the respective depressing or releasing of the brake pedal, or to apply said vacuum to effect clutch disengagement operative by the rotating of the centrifugal governor below the said predetermined minimum while said brake pedal is depressed, or to cut off said vacuum to effect clutch reengagement operative by the rotation of the centrifugal governor above said predetermined minimum while said brake pedal is still depressed.

19. Control mechanism for an automotive vehicle comprising, an engine, a rotatable shaft for propelling said vehicle, a clutch for rotatably connecting said engine to said shaft, said shaft being rotatable by movement of said vehicle when said clutch is disengaged, a vacuum motor operative to disengage said clutch, a spring for reengaging said clutch when said vacuum is cut off, a centrifugal governor secured to said shaft to rotate therewith, a brake pedal, an air valve operable by said centrifugal governor, a second air valve operable by said brake pedal, means containing air passages extending to said vacuum motor controlled by said valves, and valve operating means to close or open said air passages to effect clutch engagement or disengagement respectively operative by rotation of the centrifugal governor above a predetermined minimum speed and respectively depressing or releasing the brake pedal, or to connect said vacuum to the vacuum motor to effect clutch disengagement operative by rotation of the centrifugal governor below said predetermined minimum while said brake pedal is depressed, or to cut off said air passages to effect clutch reengagement operative by rotation of the centrifugal governor above said predetermined minimum while said brake pedal is still depressed.

20. Control mechanism for an automotive vehicle comprising, an engine, a shaft rotatable to propel said vehicle, a clutch for rotatably connecting said engine to said shaft, said shaft being rotatable by movement of said vehicle when said clutch is disengaged, a vacuum motor operative to disengage said clutch, means to reengage said clutch when said vacuum motor is inoperative, a centrifugal device secured to said shaft to rotate therewith, an air valve operable by said centrifugal device, a brake applying means, a second air valve operable by said brake applying means, means containing air passages controlled by said valves, and valve operating means operative to open said passages to effect clutch disengagement by the combined action of rotation of the centrifugal governor below a predetermined minimum and application of the brake applying means, or operative to close said passages to effect clutch reengagement by the combined action of rotation of the centrifugal governor above said predetermined minimum while said brake applying means is still operated.

21. Control mechanism for an automotive vehicle comprising, an engine, a shaft rotatable to propel said vehicle, a clutch for rotatably connecting said engine to said shaft, said shaft being rotatable by movement of said vehicle when said clutch is disengaged, a vacuum motor operative to disengage said clutch, means to reengage said clutch when said motor is inoperative, a centrifugal device secured to said shaft to rotate therewith, an air valve operable by said centrifugal device, a brake applying means, a second air valve operable by said brake applying means, means containing air passages controlled by said valves, and valve operating means operative to move said valves to close said passages to effect clutch engagement by rotation of the said centrifugal device above a predetermined minimum while said brake applying means is operated.

22. An automotive vehicle having an engine, and engine accelerator, a brake applying means, a shaft, and a clutch connecting said engine and shaft, said shaft being rotatable by movement of said vehicle when said clutch is disengaged, in combination with clutch control mechanism comprising, a fluid actuated clutch operating motor, a speed responsive device driven by said shaft, and valve mechanism operable conjointly by operation of said accelerator and said brake applying means and by said speed responsive means when said shaft passes above or below a predetermined speed, said mechanism being operative to provide open passages from said motor to a supply pipe and closed passages from said motor to the atmosphere whenever the accelerator and brake applying means are both released or when the accelerator alone is released and said shaft rotates below the said predetermined speed, or to provide closed passages from said motor to said supply pipe and open passages from said motor to said atmosphere whenever said accelerator alone is applied, or when the brake applying means is applied and the shaft rotates above said predetermined speed.

23. The combination, in an automotive vehicle, of an engine, a shaft for propelling the vehicle, a clutch for drivably connecting said engine and shaft, vehicle brakes, an engine accelerator, a centrifugal device rotatable by vehicle movement, a valve having an opening closable by application of said brakes, a second valve having an opening closable by operation of said accelerator, a third valve having an opening closable by movement of said centrifugal device above a predetermined speed, a fluid motor, and a fluid supply controlled by said valves operative to cause said motor to disengage said clutch when the third valve opens while the first valve is closed but inoperative to disengage said clutch when the third valve opens while the second valve is closed.

24. The combination, in an automotive vehicle, of an engine, a shaft for propelling the vehicle, a clutch for drivably connecting said engine to said shaft, vehicle brakes, an engine accelerator, a centrifugal device rotatable by vehicle movement, a valve having an opening closable by application of said brakes, a second valve having an opening closable by operation of said accelerator, a third valve having an opening closable by movement of said centrifugal device above a predetermined speed, a fluid motor, and a fluid supply controlled by said valves operative to cause said motor to disengage said clutch when the centrifugal device rotates below the said predetermined speed while the brake pedal is applied, but inoperative to disengage said clutch when the centrifugal device rotates below the said predetermined speed while the accelerator is being operated.

25. The combination, in an automotive vehicle, of an engine, a vehicle propelling member, a clutch for connecting said engine to said member, vehicle brakes, an engine accelerator, means responsive to vehicle speed, a valve operable by application of said brakes, a second valve operable by operation of said accelerator, a third valve operable by movement of said speed responsive device above a predetermined speed, and a fluid motor controlled by said valves operative to disengage said clutch when the speed responsive device rotates below the said predetermined speed while the brake pedal is applied, but inoperative to disengage said clutch when the speed responsive device rotates below the said predetermined speed while the accelerator is being operated.

26. The combination, in an automotive vehicle, of an engine, a vehicle propeling member, a clutch for connecting said engine and member, vehicle brakes, an engine accelerator, a speed responsive means, power means for engaging said clutch and power control means associated with said brakes, said accelerator and said speed responsive means, said power means being made operative to disengage said clutch by movement of said speed responsive means below a predetermined speed if the brake pedal is then applied, but rendered inoperative to disengage said clutch by movement of said speed responsive means below said predetermined speed if the accelerator is being operated.

FREDERICK W. COTTERMAN.